(12) United States Patent
Shimoyamada et al.

(10) Patent No.: US 7,128,998 B2
(45) Date of Patent: Oct. 31, 2006

(54) NONAQUEOUS ELECTROLYTE SECONDARY BATTERY

(75) Inventors: Takashi Shimoyamada, Tokyo (JP); Fumihata Yamamoto, Tokyo (JP); Koichi Kawamura, Yokohama (JP); Takashi Hayashi, Sodegaura (JP); Akio Hiwara, Sodegaura (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 11/066,490

(22) Filed: Feb. 28, 2005

(65) Prior Publication Data

US 2005/0196664 A1  Sep. 8, 2005

Related U.S. Application Data

(63) Continuation of application No. PCT/JP03/11164, filed on Sep. 1, 2003.

(30) Foreign Application Priority Data

Aug. 30, 2002  (JP) .............................. 2002-255609

(51) Int. Cl.
- *H01M 6/10* (2006.01)
- *H01M 6/12* (2006.01)
- *H01M 6/16* (2006.01)

(52) U.S. Cl. .................. 429/94; 429/162; 429/330
(58) Field of Classification Search ................ 429/94, 429/162, 200, 330
See application file for complete search history.

(56) References Cited

FOREIGN PATENT DOCUMENTS

| JP | 2000-348706 | * 12/2000 |
| JP | 2001-84985 | 3/2001 |
| JP | 2002-93405 | 3/2002 |
| JP | 2003-217674 | * 7/2003 |
| KR | 2005000830 | * 1/2005 |

* cited by examiner

*Primary Examiner*—Patrick Joseph Ryan
*Assistant Examiner*—Thomas H. Parsons
(74) *Attorney, Agent, or Firm*—Oblon, Spivak, McClelland, Maier & Neustadt, P.C.

(57) ABSTRACT

A nonaqueous electrolyte secondary battery includes an electrode group prepared by winding spirally or in a flattened shape a laminate structure including a separator interposed between positive and negative electrodes, and a nonaqueous electrolyte held by the electrode group, wherein an edge portion of the separator in a direction perpendicular to a winding direction protrudes outward from edges of the positive and negative electrodes in the direction perpendicular to the winding direction, and the separator satisfies conditions given by formulas (1) to (3) given below:

$$0 \leq X_1 \leq (Y_1/1.5) \leq 10 \quad (1)$$

$$X_2 \leq 10 \quad (2)$$

$$X_2 \leq Y_2 \leq 20. \quad (3)$$

14 Claims, 2 Drawing Sheets

NONAQUEOUS ELECTROLYTE SECONDARY BATTERY

CROSS-REFERENCE TO RELATED APPLICATIONS

This is a Continuation Application of PCT Application No. PCT/JP03/11164, filed Sep. 1, 2003, which was published under PCT Article 21(2) in Japanese.

This application is based upon and claims the benefit of priority from prior Japanese Patent Application No. 2002-255609, filed Aug. 30, 2002, the entire contents of which are incorporated herein by reference.

BACKGROUND OF THE INVENTION

1. Field of the Invention

The present invention relates to a nonaqueous electrolyte secondary battery.

2. Description of the Related Art

In the battery, a shutdown mechanism utilizing a separator, a current breaking element, etc. was used as the means for securing the safety in the case where the battery was over-charged.

In the shutdown mechanism utilizing a separator, the porous film used as the separator is melted when the battery temperature is elevated by the over-charging so as to close the pores of the porous film, thereby breaking the current passageway. On the other hand, when it comes to the current breaking element, the electrical resistance of the current breaking element is increased by the elevation of the battery temperature so as to break the current passageway. The current breaking element of this type includes, for example, a PTC thermistor and a fuse.

In addition to the shutdown mechanism and the current breaking element, a current breaking rupture is employed in a battery for securing the safety in the case where the battery is over-charged. The current breaking rupture is designed such that a rupture is opened by the increase in the inner pressure of the battery so as to prevent the rupture of the battery. Alternatively, the current breaking rupture is designed such that the current passageway is broken by the deformation of, for example, the rupture.

However, the energy of the battery has been increased in recent years so as to make it more and more difficult to secure the safety of the battery when the battery has been over-charged. It should be noted in this connection that, with increase in the energy of the battery, the battery is caused to generate heat rapidly when the battery is over-charged. In addition, the amount of the generated heat is increased. Further, the thermal stability of the battery has been lowered, with the result that the thermal runaway of the battery is brought about under temperatures lower than those in the prior art. In the thermal runaway, it is difficult for the current passageway to be broken by the conventional shutdown mechanism utilizing the separator or the conventional current breaking element, with the result that it is possible for the battery to be ignited or ruptured. Such being the situation, it is difficult to secure the safety of the battery when the battery is over-charged.

What should also be noted is that, in the case of employing the current breaking element or the current breaking rupture, the number of parts required forming the battery is increased so as to increase the cost of the parts and to make complex the manufacturing process of the battery. It follows that the manufacturing cost of the battery is increased.

Incidentally, a secondary battery comprising a separator formed of a porous polyolefin film is disclosed in Japanese Patent Disclosure (Kokai) No. 2000-348706. The separator used in this secondary battery has (a) a thickness of 5 to 50 µm, (b) a porosity of 40 to 80%, (c) a peak pore diameter of 0.05 to 0.2 µm, (d) an electric resistance of the electrolytic solution of 0.3 to 2.5 $\Omega \cdot cm^2/25$ µm, (e) a pin-piercing strength of 300 gf/25 µm or more, (f) a tensile strength of 300 $kg/cm^2$ or more, and (g) a thermal shrinking rate at 110° C. of 10% or less. It is taught that the separator for the battery described above permits improving the permeability of the electrolytic solution through the separator and also permits improving the discharge rate characteristics of the secondary battery.

However, a serious problem is left unsolved in the separator for the battery disclosed in the patent document quoted above. In general, an electrode group is manufactured by spirally winding in a flattened shape a laminate structure comprising a positive electrode, a negative electrode, and a separator interposed between the positive electrode and the negative electrode. If the separator disclosed in the patent document quoted above is used for manufacturing the electrode group of the construction described above, a serious problem is generated in the secondary battery comprising the particular electrode group. Specifically, the separator included in the electrode group is thermally shrunk by the elevation of the battery temperature, if the secondary battery is over-charged. Because of the shrinkage of the separator, the positive electrode and the negative electrode are caused to be brought into contact with each other in the peripheral region of the electrode group. In other words, an internal short circuit is brought about within the electrode group so as to give rise to the problem of ignition of the secondary battery.

BRIEF SUMMARY OF THE INVENTION

An object of the present invention is to provide a nonaqueous electrolyte secondary battery capable of suppressing the ignition when the secondary battery is over-charged.

According to the present invention, there is provided a nonaqueous electrolyte secondary battery, comprising:

an electrode group prepared by winding spirally or in a flattened shape a laminate structure including a positive electrode, a negative electrode, and a separator interposed between the positive and negative electrodes; and a nonaqueous electrolyte held by the electrode group;

wherein an edge portion of the separator in a direction perpendicular to a winding direction protrudes outward from edges of the positive and negative electrodes in the direction perpendicular to the winding direction, and the separator satisfies conditions given by formulas (1) to (3) given below:

$$0 \leq X_1 \leq (Y_1/1.5) \leq 10 \quad (1)$$

$$X_2 \leq 10 \quad (2)$$

$$X_2 \leq Y_2 \leq 20 \quad (3)$$

where $Y_1$ represents a thermal shrinking rate (%) in the winding direction at 90° C. of the separator, $X_1$ represents a thermal shrinking rate (%) in the direction perpendicular to the winding direction at 90° C. of the separator, $Y_2$ represents a thermal shrinking rate (%) in the winding direction at 110° C. of the separator, and $X_2$ represents a thermal shrinking rate (%) in the direction perpendicular to the winding direction at 110° C. of the separator.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
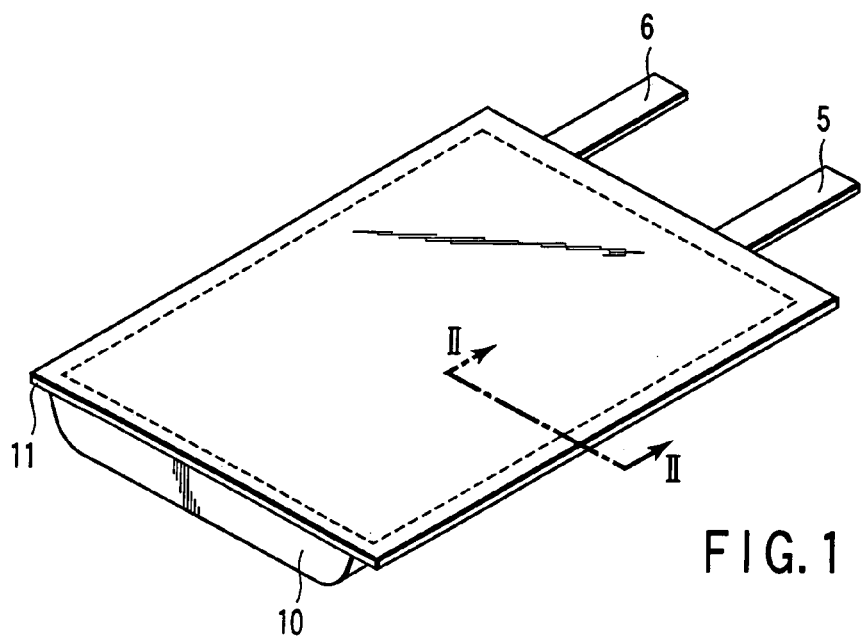
FIG. 1 is an oblique view showing a thin type nonaqueous electrolyte secondary battery as one embodiment of the nonaqueous electrolyte secondary battery of the present invention.

A nonaqueous electrolyte secondary battery, comprising:
an electrode group prepared by winding spirally or in a flattened shape a laminate structure including a positive electrode, a negative electrode, and a separator interposed between the positive and negative electrodes; and
a nonaqueous electrolyte held by the electrode group.

An edge portion of the separator in a direction perpendicular to a winding direction protrudes outward from edges of the positive and negative electrodes in the direction perpendicular to the winding direction. And the separator satisfies conditions given by formulas (1) to (3) given below:

$$0 \leq X_1 \leq (Y_1/1.5) \leq 10 \quad (1)$$

$$X_2 \leq 10 \quad (2)$$

$$X_2 \leq Y_2 \leq 20 \quad (3)$$

where $Y_1$ represents a thermal shrinking rate (%) in the winding direction at 90° C. of the separator, $X_1$ represents a thermal shrinking rate (%) in the direction perpendicular to the winding direction at 90° C. of the separator, $Y_2$ represents a thermal shrinking rate (%) in the winding direction at 110° C. of the separator, and $X_2$ represents a thermal shrinking rate (%) in the direction perpendicular to the winding direction at 110° C. of the separator.

Figure 5:
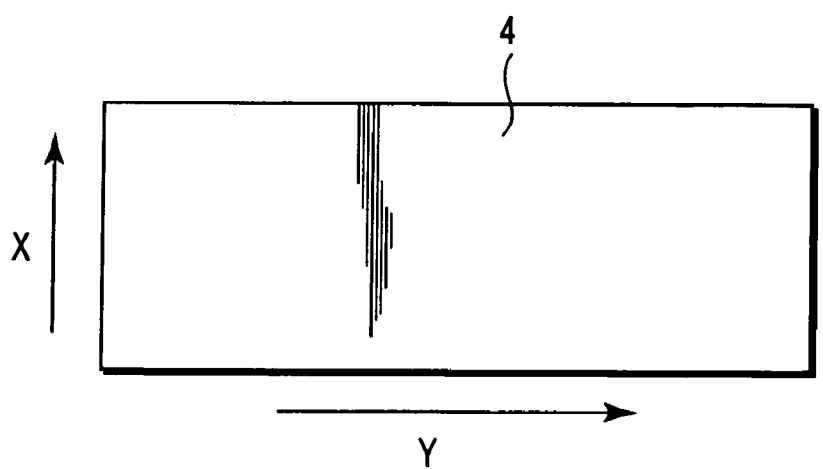
FIG. 5 is a plan view schematically showing the separator included in the thin type nonaqueous electrolyte secondary battery shown in FIG. 1.

FIG. 5 is a plan view showing the separator included in the nonaqueous electrolyte secondary battery according to one embodiment of the present invention. The separator is denoted by a reference numeral 4 in the drawing. This drawing is intended to define clearly the directions of the sides of the separator 4. Specifically, the direction parallel to the winding axis about which the laminate structure including the positive electrode, the negative electrode and the separator is wound in preparing a wound type electrode group is denoted by an arrow X in FIG. 5. On the other hand, the direction perpendicular to the direction denoted by the arrow X is the winding direction. This direction is denoted by an arrow Y in FIG. 5.

According to one embodiment of the present invention, the separator is thermally shrunk in the winding direction earlier than in the direction perpendicular to the winding direction when the battery is heated or caused to generate heat by the external short circuit or by the over-charging of the battery. Therefore, it is possible to suppress the thermal shrinkage of the separator in the direction perpendicular to the winding direction. It follows that it is possible to provide a battery having a high safety, which is unlikely to be short-circuited.

Also, it is possible to further improve the safety of the battery under the over-charged state by adding a halogenated aromatic hydrocarbon to the nonaqueous electrolyte.

In order to prevent the battery from being ruptured or ignited under the over-charged state, it is necessary to break the current passageway before the thermal runaway phenomenon is brought about in the battery including the electrode group. The thermal runaway phenomenon of the battery under the over-charged state is brought about by the progress of the over-charging and the heat generation accompanying the progress of the over-charging. On the other hand, the mechanism for the separator to break the current passageway represents the phenomenon that the separator is melted by the heat generation from the battery accompanying the progress of the over-charging so as to break the current passageway. It follows that the elevation of the battery temperature is absolutely necessary for the current breaking mechanism of the separator. Under the circumstances, if the heat generation other than the self-heat generation of the power generating mechanism is added so as to make it possible to break the current passageway at an early timing, it is possible to stop the progress of the over-charging in a region where the degree of over-charging is relatively low so as to enhance the safety of the battery. The halogenated aromatic hydrocarbon scarcely reacts with any of the positive electrode, the negative electrode and the nonaqueous electrolyte until the battery voltage is elevated to about 4V under which the battery is generally used. However, where the battery voltage has been elevated to over 4V because of the over-charging, the battery is caused to generate heat by the oxidation reaction of the halogenated aromatic hydrocarbon. Since the heat generating reaction of the halogenated aromatic hydrocarbon is brought within a region where the degree of over-charging is relative low and, thus, the thermal runaway of the battery is not generated, the separator breaks the current passageway at an earlier timing so as to further enhance the safety of the battery.

Each of the positive electrode, the negative electrode, the separator, and the nonaqueous electrolyte will now be described in detail.

1) Positive Electrode:

The positive electrode includes a current collector and a positive electrode layer formed on one surface or each of both surfaces of the current collector and containing an active material.

The positive electrode layer contains a positive electrode active material, a binder and a conductive agent.

The positive electrode active material includes various oxides such as manganese dioxide, a lithium-manganese composite oxide, a lithium-containing nickel oxide, a lithium-containing cobalt oxide, a lithium-containing nickel-cobalt oxide, a lithium-containing iron oxide, a lithium-containing vanadium oxide, and chalcogen compounds such as titanium disulfide and molybdenum disulfide. Particularly, it is desirable to use a lithium-containing cobalt oxide (e.g., $LiCoO_2$), a lithium-containing nickel-cobalt oxide (e.g., $LiNi_{0.8}Co_{0.2}O_2$), or a lithium-manganese composite oxide (e.g., $LiMn_2O_4$ and $LiMnO_2$) as the positive electrode active material because the materials exemplified above make it possible to obtain a high battery voltage. Incidentally, it is possible to use the positive electrode active materials exemplified above singly or in the form of a mixture of a plurality of the materials exemplified.

The conductive agent includes, for example, acetylene black, carbon black and graphite.

The binder includes, for example, polytetrafluoroethylene (PTFE), polyvinylidene fluoride (PVdF), polyether sulfone, ethylene-propylene-diene copolymer (EPDM), and styrene-butadiene rubber (SBR).

When it comes to the mixing ratios of the positive electrode active material, the conductive agent and the binder, it is desirable for the positive electrode active material to be contained in an amount of 80 to 95% by weight, for the conductive agent to be contained in an amount of 3 to 20% by weight, and for the binder to be contained in an amount of 2 to 7% by weight.

It is possible to use a porous conductive substrate or a nonporous conductive substrate as the current collector. These conductive substrates can be made of, for example, aluminum, stainless steel or nickel.

The positive electrode can be manufactured by preparing a suspension by dispersing a positive electrode active material, a conductive agent and a binder in a suitable solvent, followed by coating the current collector with the suspension thus prepared and subsequently drying and pressing the current collector coated with the suspension.

2) Negative Electrode:

The negative electrode includes a current collector and a negative electrode layer supported by one surface or each of both surfaces of the current collector.

The negative electrode layer contains a negative electrode active material capable of absorbing-releasing lithium ions and a binder.

The negative electrode active material noted above includes, for example, a graphitized material or a carbonaceous material such as graphite, coke, carbon fiber, a pyrolytic vapor phase carbonaceous material, or a baked resin; a graphitized material or a carbonaceous material obtained by applying a heat treatment at 500 to 3,000° C. to, for example, a thermosetting resin, an isotropic pitch, a mesophase pitch-based carbon, a mesophase pitch-based carbon fiber, or a mesophase microbeads (particularly, a mesophase pitch-based carbon fiber being desirable because the capacity and the charge-discharge cycle characteristics of the battery can be improved); chalcogen compounds such as titanium disulfide, molybdenum disulfide and niobium selenide; and light metals such as aluminum, an aluminum alloy, a magnesium alloy, lithium and a lithium alloy. Particularly, it is desirable to use as the negative electrode active material a graphitized material having a graphite crystal in which the layer spacing $d_{002}$ of the (002) plane is not larger than 0.34 nm. The battery capacity and the large current discharge characteristics can be markedly improved in the nonaqueous electrolyte secondary battery comprising the negative electrode including the particular graphitized material noted above as the negative electrode active material. It is more desirable for the layer spacing $d_{002}$ noted above to be not larger than 0.337 nm.

The binder includes, for example, polytetrafluoroethylene (PTFE), polyvinylidene fluoride (PVdF), ethylene-propylene-diene copolymer (EPDM), styrene-butadiene rubber (SBR), and carboxymethyl cellulose (CMC).

Concerning the mixing ratio of the negative electrode active material (for example, carbonaceous material) and the binder, it is desirable for the negative electrode active material to be contained in an amount of 90 to 98% by weight and for the binder to be contained in an amount of 2 to 20% by weight.

It is possible to use a porous conductive substrate or a nonporous conductive substrate as the current collector. These conductive substrates can be made of, for example, copper, stainless steel or nickel.

For preparing the negative electrode, a suspension is prepared by kneading a negative electrode active material and a binder in the presence of a solvent. Then, a current collector is coated with the resultant suspension, followed by drying the current collector coated with the suspension and subsequently pressing the current collector coated with the suspension under a desired pressure once or 2 to 5 times in multi-stage.

3) Separator:

A finely porous synthetic resin film can be used as the separator. The synthetic resin used for forming the separator includes, for example, a polyolefin such as polyethylene or polypropylene, and a polyolefin composition such as an ethylene-propylene copolymer or an ethylene-butene copolymer. The resins given above can be used singly or in the form of a mixture of a plurality of the resins given above for forming a separator. Particularly, it is desirable to use polyethylene for forming the separator because the polyethylene separator exhibits a high stability against the halogenated aromatic hydrocarbon and, thus, permits further improving the saftey of the battery under an over-charged state.

The edge portion of the separator in the direction perpendicular to the winding direction protrudes from the edges of the positive and negative electrodes in the direction perpendicular to the winding direction. It is desirable for the separator to have the largest length in the direction perpendicular to the winding direction, for the negative electrode to have the second largest length in the direction perpendicular to the winding direction, and for the positive electrode to have the smallest length in the direction perpendicular to the winding direction.

It is desirable for the protruding amount of the separator from the edge of the negative electrode to fall within a range of 0.5 mm to 5 mm. If the protruding amount of the separator is smaller than 0.5 mm, it may be difficult to suppress the internal short circuit of the battery under an over-charged state. On the other hand, if the protruding amount of the separator noted above exceeds 5 mm, the energy density of the secondary battery may be lowered. It is more desirable for the protruding amount of the separator from the edge of the negative electrode to fall within a range of 1 mm to 3 mm. Incidentally, the edge portions of separator are allowed to protrude in the direction perpendicular to the winding direction on both sides of the electrode group, as apparent from FIG. 3. The protruding amount of the separator described above denotes the protruding amount on one side in the direction perpendicular to the winding direction. It follows that, where it is defined that the protruding amount of the separator is 0.5 mm, the sum of the protruding amounts on both sides of the electrode group is 1 mm.

The separator satisfies the conditions given by formulas (1) to (3) given below:

$$0 \leq X_1 \leq (Y_1/1.5) \leq 10 \quad (1)$$

$$X_2 \leq 10 \quad (2)$$

$$X_2 \leq Y_2 \leq 20 \quad (3)$$

where $Y_1$ represents a thermal shrinking rate (%) in the winding direction at 90° C. of the separator, $X_1$ represents a thermal shrinking rate (%) in the direction perpendicular to the winding direction, i.e., the direction parallel to the winding axis, at 90° C. of the separator, $Y_2$ represents a thermal shrinking rate (%) in the winding direction at 110° C. of the separator, and $X_2$ represents a thermal shrinking rate (%) in the direction perpendicular to the winding direction, i.e., the direction parallel to the winding axis, at 110° C. of the separator.

Formula (1) given above defines the condition of "$0 \leq X_1 \leq (Y_1/1.5) \leq 10$". Under the condition of "$X_1 > (Y_1/1.5)$", i.e., if shrinking rate $Y_1$ noted above is lower than the value that is 1.5 times as high as the shrinking rate $X_1$ noted above, the timing at which the edge portion of the separator in the direction perpendicular to the winding direction is thermally shrunk is substantially equal or close to the timing at which the edge portion of the separator in the winding direction is thermally shrunk. As a result, it is impossible to suppress the internal short circuit of the secondary battery under an over-charged state of the secondary battery. Also, if the value of shrinking rate $Y_1$ exceeds 15%, i.e., if the value ($Y_1/1.5$) exceeds 10%, it is possible for the electrode group itself to be deformed by the shrinkage of the separator. If the electrode group is deformed at the initial stage of the shrinkage of the separator under temperatures around 90° C., the distance between the positive and negative electrodes is increased in some portion. In this case, it may be difficult to obtain the effect produced by the construction that the edge portion of the separator in the winding direction is allowed to be shrunk first.

Further, it is desirable for the thermal shrinking rate Y1 to fall within a range of 0.5% to 7%. If the thermal shrinking rate Y1 is lower than 0.5%, it may be difficult to obtain a sufficient effect even if the edge portion of the separator in the winding direction is allowed to shrink first. On the other hand, the deformation of the electrode group is made smaller in the case where the thermal shrinking rate Y1 does not exceed 7%, with the result that the desired effect of the present invention can be obtained without fail.

It is desirable for the thermal shrinking rate $X_1$ to be as small as possible. However, the separator exhibits a sufficiently high mechanical strength even if the separator is thermally shrunk to some extent. In addition, the separator that is slightly shrunk thermally can be manufactured at a low manufacturing cost, compared with the separator in which the thermal shrinkage does not take place at all. Such being the situation, it is more desirable for the thermal shrinking rate $X_1$ to be not lower than 0.1%.

Formulas (2) and (3) given above define the conditions of "$X_2 \leq 10$" and "$X_2 \leq Y_2 \leq 20$". If the thermal shrinking rate $X_2$ of the separator exceeds 10% or if the thermal shrinking rate $Y_2$ of the separator exceeds 20%, the probability of the internal short circuit occurrence after breakage of the current passageway is increased under the over-charged state of the secondary battery, leading to an increase in the number of secondary batteries that are ignited after breakage of the current passageway. It is more desirable for the thermal shrinking rate $X_2$ to be not higher than 5%. Also, it is more desirable for the thermal shrinking rate $Y_2$ to be not higher than 10%.

As described above, the separator satisfying the conditions given by formulas (1) to (3) produces a prominent effect of suppressing the internal short circuit of the secondary battery when the battery is heated or is caused to generate heat by the external short circuit or by the overcharging of the battery. Specifically, when the battery is heated or caused to generate heat, the edge portion of the separator protruding from the edges of the positive and negative electrodes in the direction perpendicular to the winding direction is thermally shrunk promptly along the winding direction. As a result, the protruding edge portion of the separator is bent inward and caught by the edge portions of the positive and negative electrodes, with the result that the separator is prevented from being thermally shrunk in the direction perpendicular to the winding direction. It follows that the positive and negative electrodes are prevented from being brought into direct contact so as to prevent the occurrence of the internal short circuit, as pointed out above. Such being the situation, it is possible to prevent the ignition of the secondary battery when the battery is abnormally heated.

It is desirable for the separator to have a gas permeability falling within a range of 200 to 600 sec/100 cm³. The gas permeability denotes the time (seconds) required for 100 cm³ of the air to pass through the separator and is measured by the method stipulated in JIS (Japanese Industrial Standards) P8117. It is more desirable for the separator to have a gas permeability falling within a range of 250 to 500 sec/100 cm³, furthermore desirably 300 to 450 sec/100 cm³.

It is desirable for the porosity of the separator to fall within a range of 30 to 60%, more desirably 35 to 50%.

It is desirable for the thickness of the separator to be not larger than 30 μm, more desirably not larger than 25 μm. Also, it is desirable for the lower limit of the separator thickness to be set at 5 μm, more desirably at 8 μm.

The separator satisfying the conditions given by formulas (1) to (3) given previously is manufactured, for example, as follows.

Specifically, a mixture containing polyethylene and a plasticizer, e.g., paraffin wax, is extruded by using a biaxial extruder so as to obtain a raw film by the inflation method. The raw film thus obtained is dipped in isopropanol so as to remove the paraffin wax by extraction. Then, the resultant polyolefin film is stretched in a vertical direction by using a roll stretching machine, followed by further stretching the film in a lateral direction by using a tenter stretching machine so as to obtain a finely porous polyethylene film. Further, a thermal shrinking treatment is applied to the porous polyethylene film by using a heat roll.

The final thermal shrinkage of the separator can be controlled by, for example, controlling the stretching rate and the thermal shrinking treatment. If the stretching rate is set high in the stretching step, the thermal shrinkage of the separator is made large when the separator is heated. However, the final thermal shrinking rate can be made small if the separator is shrunk in advance.

It follows that, by controlling the stretching rate in the step of stretching the film by using a roll stretching machine and a tenter stretching machine and by controlling the heating temperature in the step of applying the thermal shrinking treatment to the film by using a heat roll, it is possible to allow the thermal shrinking rate of the separator at 90° C. and 110° C. to satisfy the conditions given by formulas (1) to (3) given previously.

The electrode group is prepared by combining the positive electrode, the negative electrode, and the separator. Specifically, the electrode group can be prepared by, for example, winding spirally or in a flattened shape a laminate structure comprising the positive electrode, the negative electrode, and the separator interposed between the positive and negative electrodes.

It is not absolutely necessary to press the electrode group. However, it is possible to press the electrode group in order to improve the integral bonding strength among the positive electrode, the negative electrode, and the separator. It is also possible to apply heating in the step of pressing the electrode group.

It is possible for the electrode group to contain a polymer compound having an adhesivity in order to increase the integral bonding strength among the positive electrode, the negative electrode, and the separator. The polymer compound having an adhesivity, includes, for example, polyacrylonitrile (PAN), polyacrylate (PMMA), polyvinylidene fluoride (PVdF), polyvinyl chloride (PVC) and polyethylene oxide (PEO).

4) Nonaqueous Electrolyte:

The nonaqueous electrolyte comprises a nonaqueous solvent and an electrolyte such as a lithium salt, which is dissolved in the nonaqueous solvent. It is possible for the nonaqueous electrolyte to be in the form of a liquid (i.e., a liquid nonaqueous electrolyte) or a gel-like nonaqueous electrolyte.

The nonaqueous solvent will now be described first.

The nonaqueous solvent contains a halogenated aromatic hydrocarbon. The halogenated aromatic hydrocarbon includes compounds that have an oxidation potential of 4.7V to 5.0V relative to the potential of metal lithium. It is possible to add a single kind of or a plurality of different kinds of halogenated aromatic hydrocarbon compounds to the nonaqueous solvent.

A nonaqueous electrolyte containing γ-butyrolactone (GBL) and a cyclic carbonate can be used in a secondary battery. If the over-charging of the secondary battery using the nonaqueous electrolyte noted above has caused the positive electrode potential to be increased to 4.7V or more relative to the potential of metal lithium, the decomposition reaction of GBL and an exothermic reaction accompanying the decomposition reaction are gradually started on the positive electrode. If the secondary battery has been further over-charged so as to cause the positive electrode potential to be increased to exceed 5.0V relative to the potential of metal lithium, the decomposition reaction and the exothermic reaction noted above are caused to proceed vigorously. If the separator generates the shutdown phenomenon in this stage in accordance with elevation of the battery voltage, the flow of the lithium ions is broken so as to overcome safely the over-charged state of the secondary battery. However, in order to bring about the shutdown phenomenon completely, it is necessary for the battery temperature to be elevated in a short time to the shutdown temperature at which the resin constituting the separator is plastically deformed uniformly over the entire area in which the separator is in contact with the positive electrode and negative electrode. The time required for the separator temperature to be elevated to reach the shutdown temperature is shortened with increase in the flowing amount of the current and is prolonged with decrease in the flowing amount of the current. Also, the time required for the separator temperature to be elevated to reach the shutdown temperature is prolonged with increase in the efficiency of the heat dissipation from the secondary battery to the outside and is shortened with decrease in the efficiency of the heat dissipation noted above. The efficiency of the heat dissipation differs depending on the materials and the shapes of the members forming the secondary battery.

A prominent effect can be obtained, if the halogenated aromatic hydrocarbon that can be oxidized under the potential of 4.7V to 5.0V relative to the potential of metal lithium is added to the nonaqueous solvent. Specifically, heat is generated by the oxidizing reaction of the halogenated aromatic hydrocarbon in addition to the heat generated by the reaction between the positive electrode and GBL. It follows that the separator temperature is elevated to reach the shutdown temperature in a short time so as to make it possible to bring about the shutdown phenomenon without fail.

Incidentally, where a substance that has an oxidation potential lower than 4.7V relative to the potential of metal lithium is added to the nonaqueous solvent, the reaction of the added substance is finished before the heat is generated by the reaction of GBL. It follows that it is possible for the separator temperature not to be elevated to reach the shutdown temperature in a short time. On the other hand, where a substance that has an oxidation potential exceeding 5.0V relative to the potential of metal lithium is added to the nonaqueous solvent, heat is generated by the reaction between the positive electrode and GBL before the added substance is subjected to the oxidizing reaction. It follows that the battery. temperature is already elevated when the added substance is subjected to the oxidizing reaction. If heat is generated by the oxidizing reaction under the particular state, the thermal runaway may be promoted.

Among the halogenated aromatic hydrocarbon compounds that have the oxidation potential of 4.7V to 5.0V relative to the potential of metal lithium, it is desirable to use chlorobenzene (CB) having an oxidation potential of 5.0V, fluorobenzene (FB) having an oxidation potential of 5.0V, chlorotoluene (CT) and fluorotoluene (FT). It is particularly desirable to use o-fluorotoluene (o-FT) having an oxidation potential of 4.9V, o-chlorotoluene (o-CT) having an oxidation potential of 4.8V, and p-chlorotoluene (p-CT) having an oxidation potential of 4.8V. Incidentally, the oxidation potential noted above is the potential relative to the potential of metal lithium.

The heat accompanying the oxidizing reaction of at least one kind of the halogenated toluene selected from the group consisting of o-fluorotoluene, o-chlorotoluene and p-chlorotoluene is generated simultaneously with the exothermic reaction between the positive electrode and γ-butyrolactone (GBL) In addition, a large amount of heat is generated by the oxidizing reaction of the halogenated toluene compounds noted above. It follows that, in the case of using a nonaqueous solvent containing a halogenated toluene compound and GBL, a large amount of heat can be obtained in a short time so as to elevate the separator temperature to the shutdown temperature. Such being the situation, the shutdown phenomenon can be generated without fail under the over-charged state of the secondary battery. It should also be noted that the halogenated toluene compounds exemplified above do not react with any of the positive electrode, the negative electrode and the nonaqueous electrolyte (particularly GBL) when the positive electrode potential is lower than 4.7V relative to the potential of metal lithium, with the result that the charge-discharge characteristics of the secondary battery are not impaired. Further, polymers of the halogenated toluene compounds are formed by the oxidizing reaction of the halogenated toluene compounds. The polymers thus formed are attached to the separator so as to close the pores of the separator, thereby enhancing the current breaking effect produced by the separator.

It is desirable for the weight ratio of the halogenated aromatic hydrocarbon compound relative to the total weight of the nonaqueous solvent to fall within a range of 0.1 to 15% by weight. If the ratio of the halogenated aromatic hydrocarbon compound is lower than 0.1% by weight, the amount of heat generated by the oxidizing reaction of the halogenated aromatic hydrocarbon compound is decreased so as to possibly lower the shutdown effect produced by the separator. By contraries, if the ratio of the halogenated aromatic hydrocarbon compound exceeds 15% by weight, an excessively large amount of heat is generated by the oxidizing reaction of the halogenated aromatic hydrocarbon compound so as to elevate rapidly the temperature of the secondary battery. In this case, the thermal runaway phenomenon may possibly be brought about.

It is more desirable for the ratio of the halogenated aromatic hydrocarbon compound to fall within a range of 0.5 to 10% by weight, furthermore desirably, 1 to 8% by weight.

It is desirable for the nonaqueous solvent containing the halogenated aromatic hydrocarbon compound and GBL to further contain a cyclic carbonate in order to suppress the reaction between the negative electrode and GBL during storage of the secondary battery under high temperatures. The particular nonaqueous solvent permits improving the storage characteristics under high temperatures and the charge-discharge cycle life of the secondary battery. The cyclic carbonate includes, for example, ethylene carbonate (EC) and propylene carbonate (PC). Particularly, it is desirable to use EC because EC produces a prominent effect of suppressing the reaction between the lithium ion and GBL. It is possible to use a single kind of the cyclic carbonate or a plurality of different kinds of cyclic carbonates in combination.

It is possible for the nonaqueous solvent to contain an auxiliary component in addition to GBL, the cyclic carbonate and the halogenated aromatic hydrocarbon.

The auxiliary component includes, for example, vinylene carbonate, vinyl ethylene carbonate, phenyl ethylene carbonate, diethyl carbonate, dimethyl carbonate, ethyl methyl carbonate, γ-valerolactone, methyl propionate, ethyl propionate, 2-methyl furan, furan, thiophene, catechol carbonate, ethylene sulfite, 12-crown-4, and tetraethylene glycol dimethyl ether.

Particularly, the nonaqueous solvent containing an auxiliary component that contains vinylene carbonate (VC) permits forming a dense protective film on the surface of the negative electrode so as to make it possible to further lower the reactivity of the lithium ion absorbed by the negative electrode active material with GBL. It follows that the discharge characteristics after storage for a long time can be further improved. It is desirable for the amount of the auxiliary component contained in the nonaqueous solvent to be not larger than 10% by weight. If the auxiliary component is contained in an amount exceeding 10% by weight, the permeability of the lithium ion through the protective film on the surface of the negative electrode is lowered so as to markedly impair the discharge characteristics of the secondary battery under low temperatures. It is more desirable for the weight ratio of the auxiliary component to fall within a range of 0.01 to 5% by weight, furthermore desirably, 0.1 to 3% by weight.

It is desirable for the nonaqueous solvent to contain a surfactant such as trioctyl phosphate (TOP) in order to improve the wettability of the nonaqueous solvent with the separator. The addition amount of the surfactant should desirably be not larger than 3%, furthermore desirably, should fall within a range of 0.1 to 1%.

The electrolyte that is dissolved in the nonaqueous solvent includes, for example, lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bis-trifluoro methylsulfonylimide ($LiN(CF_3SO_2)_2$), and lithium bis-pentafluoro ethylsulfonylimide ($LiN(C_2F_5SO_2)_2$). These lithium salts can be used singly or in the form of a mixture of a plurality of different kinds of these lithium salts.

Particularly, it is desirable to use $LiBF_4$ as the electrolyte because, when the temperature of the secondary battery is elevated, the reactivity of this compound with the positive electrode is low so as to further enhance the safety of the secondary battery under an over-charged state. Also, the cycle life of the secondary battery under high temperatures can be further improved in the case of using a mixture of lithium salts containing $LiBF_4$ and at least one of $LiN(CF_3SO_2)_2$ and $LiN(C_2F_5SO_2)_2$, or a mixture of lithium salts containing $LiBF_4$ and $LiPF_6$.

It is desirable for the electrolyte to be dissolved in the nonaqueous solvent in an amount of 0.5 to 2.5 mol/L, more desirably, 1 to 2.5 mol/L.

It is desirable for the amount of the liquid nonaqueous electrolyte to be set at 0.2 to 0.6 g per 100 mAh of the battery unit capacity, more desirably 0.25 to 0.55 g/100 mAh.

5) Case:

It is possible to use a metal can (e.g., an aluminum can or an iron can) or any of containers (a) to (d) given below as the case for housing the electrode group:

a) A container molded in the shape of an envelope by sealing by heat-seal a sheet including a thermo-plastic resin layer;

b) A container prepared by sealing by heat-seal the four sides of two sheets superposed one upon the other, each sheet including a thermoplastic resin layer;

c) A container prepared by folding double a sheet including a thermoplastic resin layer such that the folded sections of the sheet are superposed one upon the other, and by sealing by heat-seal the three sides of the folded sections of the sheet; and d) A container prepared by molding a sheet including a thermoplastic resin layer into the shape of a cup by applying a press molding, followed by fixing a lid to close the opening of the cup by applying a heat seal.

It is desirable for the sheet including a thermo-plastic resin layer to comprise an outer protective layer forming one surface of the sheet, a thermoplastic resin layer forming the other surface of the sheet, and a metal layer interposed between the outer protective layer and the thermoplastic resin layer. It is acceptable for the sheet to include an adhesive used for bonding the adjacent component layers of the sheet. Also, it is possible for each layer included in the sheet to be formed of a single kind of the material or a plurality of different kinds of the materials.

It is desirable for the thermoplastic resin layer to be formed of a polyethylene-based resin in order to prevent the deterioration caused by the halogenated aromatic hydrocarbon contained in the nonaqueous electrolyte. The polyethylene-based resin noted above includes, for example, a low density polyethylene, a high density polyethylene, a linear low density polyethylene, an ethylene/α-olefin ($C_3$~$C_8$)

copolymer such as ethylene/butene-1 copolymer, a crosslinked polyethylene, and an acid-modified polyethylene.

The outer protective layer can be formed of, for example, polyamide resin.

Further, the metal layer can be formed of, for example, an aluminum alloy, aluminum, stainless steel, iron, copper or nickel.

It is desirable for the sheet including a thermo-plastic resin layer to have a thickness not larger than 0.3 mm, more desirably, a thickness of 0.05 to 0.3 mm.

A thin type nonaqueous electrolyte secondary battery will now be described in detail with reference to FIGS. 1 to 5 as one embodiment of the nonaqueous electrolyte secondary battery of the present invention.

Figure 2:
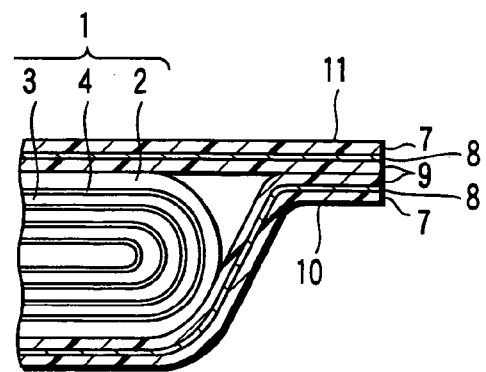
FIG. 2 is a partial cross sectional view of the thin type nonaqueous electrolyte secondary battery shown in FIG. 1 along the line II—II shown in FIG. 1.
Figure 3:
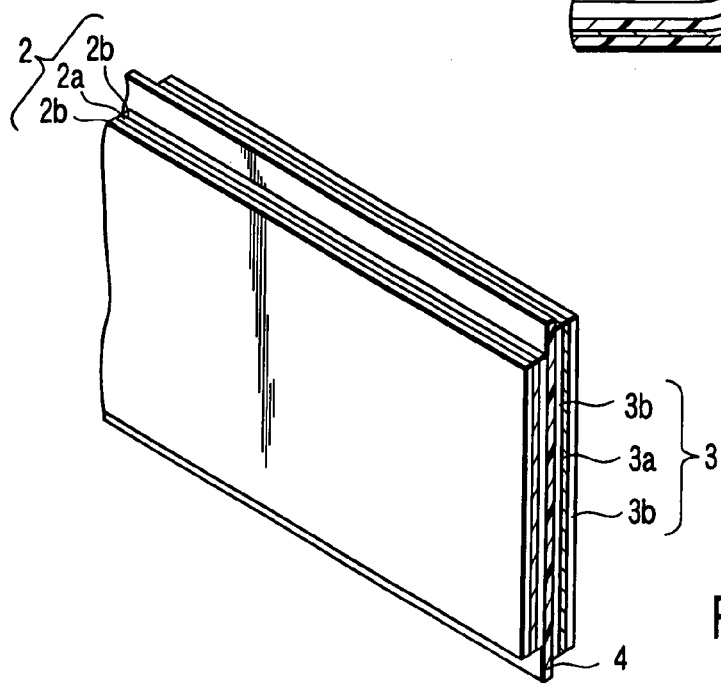
FIG. 3 is an oblique view schematically showing the positional relationship among the positive electrode, the negative electrode, and the separator included in the electrode group.
Figure 4:
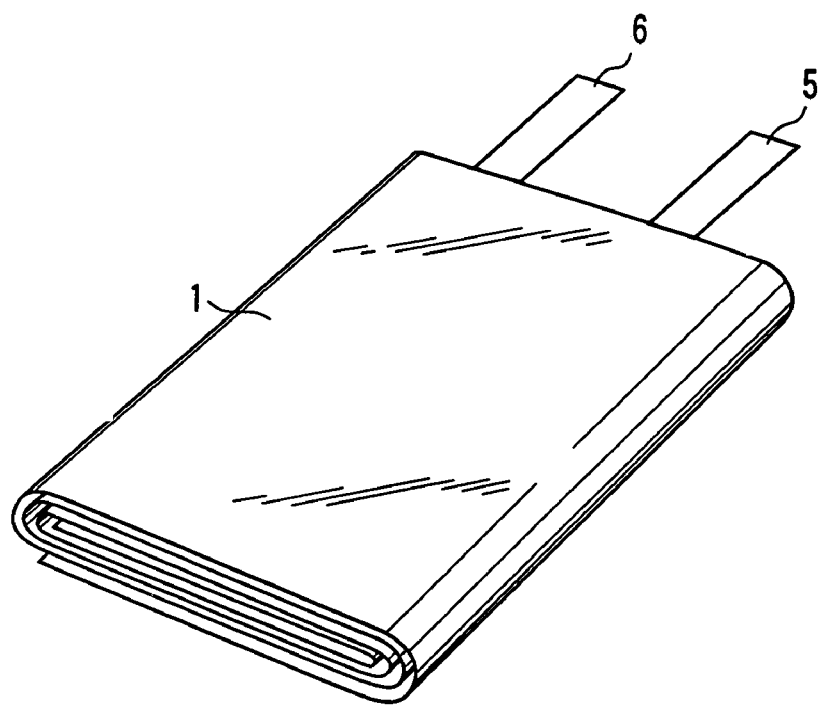
FIG. 4 is an oblique view schematically showing the construction of the electrode group included in the thin type nonaqueous electrolyte secondary battery shown in FIG. 1.

FIG. 1 is an oblique view showing a thin type nonaqueous electrolyte secondary battery as one embodiment of the nonaqueous electrolyte secondary battery of the present invention, FIG. 2 is a cross sectional view showing the construction of the thin type nonaqueous electrolyte secondary battery shown in FIG. 1 along the line II—II shown in FIG. 1, FIG. 3 is an oblique view schematically showing the positional relationship among the positive electrode, the negative electrode, and the separator, FIG. 4 is an oblique view schematically showing the construction of the electrode group included in the thin type nonaqueous electrolyte secondary battery shown in FIG. 1, and FIG. 5 is a plan view schematically showing the separator included in the thin type nonaqueous electrolyte secondary battery shown in FIG. 1.

An electrode group 1 comprising a positive electrode 2, a negative electrode 3, and a separator 4 interposed between the positive electrode 2 and the negative electrode 3 is housed in a case. The positive electrode 2 includes a positive electrode current collector 2a, and a positive electrode layer 2b supported by each of the both surfaces of the current collector 2a. On the other hand, the negative electrode 3 comprises a negative electrode current collector 3a and a negative electrode layer 3b supported by each of the both surfaces of the current collector 3a. Further, the separator 4 satisfies the conditions given by formulas (1) to (3) given previously, in which Y (%) represents the thermal shrinking rate in the longitudinal direction (winding direction ) of the separator 4, and X (%) represents the thermal shrinking rate in the short side direction (i.e., direction parallel to the winding axis) of the separator 4. The length in the short side direction of the separator 4 is larger than that of the negative electrode 3, and the length in the short side direction of the negative electrode 3 is larger than that of the positive electrode 2. Further, the positive electrode 2, the negative electrode 3 and the separator 4 are superposed one upon the other such that the edge portion of the separator 4 in a direction perpendicular to a winding direction, i.e., the short side direction noted above, is allowed to protrude from the edges in a direction perpendicular to the winding direction of the positive electrode 2 and the negative electrode 3, as shown in FIG. 3. Under this state, the laminate structure including the positive electrode 2, the negative electrode 3 and the separator 4 is wound in a flattened shape so as to obtain the electrode group 1.

The nonaqueous electrolyte is held by the electrode group 1. A positive electrode lead 5 is electrically connected to the positive electrode 2, and a negative electrode lead 6 is electrically connected to the negative electrode 3. These leads 5 and 6 are withdrawn from within the case to the outside of the case so as to play the roles of the positive electrode terminal and the negative electrode terminal, respectively, as apparent from FIGS. 1 and 4.

For preparing the case housing the electrode group 1, a sheet including an outer protective layer 7, a metal layer 8 and a thermoplastic resin layer 9 is prepared. Then, the sheet is subjected to, for example, the press molding process so as to form a housing section 10 in the sheet. In this step, the sheet is molded such that the thermoplastic resin layer 9 constitutes the inner surface of the housing section 10 as apparent from FIG. 2. Then, the electrode group 1 and the nonaqueous electrolyte are housed in the housing section 10 such that the tip portions of the positive electrode lead 5 and the negative electrode lead 6 are positioned outside the housing section 10. Under the particular condition, the sheet is folded double so as to permit the opening of the housing section 10 to be closed by a lid plate 11 formed of the folded half portion of the sheet as shown in FIG. 1. As a result, the sheet is formed into a closed container. The sheet is folded such that the thermo-plastic resin layer 9 included in the housing section 10 and the thermoplastic resin layer 9 in the lid plate 11 are allowed to overlap each other. Then, heat-sealing is applied to the four sides of the folded sheet so as to seal the four sides of the rectangular container.

Examples of the present invention will now be described in detail with reference to the drawings.

EXAMPLE 1

<Preparation of Positive Electrode>

In the first step, a slurry was prepared by adding 5% by weight of acetylene black, and a dimethyl formamide (DMF) solution containing 5% by weight of polyvinylidene fluoride (PVdF) to 90% by weight of lithium-cobalt oxide ($Li_xCoO_2$, where x is: $0<x \leqq 1$) while stirring the mixture. Then, the both surfaces of a current collector formed of an aluminum foil having a thickness of 15 µm were coated with the slurry thus prepared, followed by drying and, then, pressing the current collector coated with the slurry so as to manufacture a positive electrode constructed such that positive electrode layers were supported on both surfaces of the current collector. Incidentally, the positive electrode layer formed on one surface of the current collector was found to have a thickness of 60 µm. Also, the positive electrode had a length of 50 mm in the short side direction.

<Preparation of Negative Electrode>

A slurry was prepared by mixing 95% by weight of a powdery mesophase-based carbon fiber subjected to a heat treatment at 3,000° C. and a dimethyl formaldehyde (DMF) solution containing 5% by weight of polyvinylidene fluoride (PVdF). The carbon fiber was found to have 0.336 nm of a layer spacing ($d_{002}$) of the (002) plane, which was determined by a powder X-ray. diffraction. Then, the both surfaces of a copper foil used as a current collector were coated with the slurry thus obtained, followed by drying and, then, pressing the copper foil coated with the slurry so as to manufacture a negative electrode constructed such that negative electrode layers were supported by both surfaces of the current collector. Incidentally, the negative electrode layer formed on one surface of the current collector was found to have a thickness of 55 µm. Also, the length of the negative electrode in the short side direction was 51 nm.

Incidentally, the layer spacing ($d_{002}$) of the (002) plane of the carbonaceous material was obtained from the powder X-ray diffraction spectrum by FWHM (full width at half-maximum middle point method). In this case, the scattering such as the Lorentz scattering was not corrected.

\<Separator\>

A mixture consisting of 25% by weight of polyethylene and 75% by weight of paraffin wax was extruded by using a biaxial extruder at an extruding temperature of 170° C. and extruding rate of 10 kg/h so as to obtain a raw film by an inflation method. The film thus obtained was dipped in isopropanol so as to remove the paraffin wax by extraction. Then, the resultant polyethylene film was stretched at 100° C. in a vertical direction by using a roll stretching machine a length 3 times as large as the original length, followed stretching the film at 120° C. in a lateral direction by using a tenter stretching machine to a length 2.5 times as large as the original length. Further, the stretched film was subjected to a thermal shrinking treatment at 75° C. by using a heat roll, thereby obtaining a finely porous polyethylene film having a thickness of 25 μm and a gas permeability of 400 sec/100 cm$^3$. A film piece having a short side width of 55 mm was cut out from the porous polyethylene film thus obtained so as to obtain a separator for the secondary battery.

The separator thus obtained was left to stand for one hour in an oven set at 90° C. so as to obtain a thermal shrinking rate $X_1$ (%) at 90° C. in the direction parallel to the winding axis (short side direction) and a thermal shrinking rate $Y_1$ (%) at 90° C. in the winding direction (long side direction). The thermal shrinking rate was obtained from the difference in size between the separator before the heating in the oven and the separator after the heating in the oven. Table 1 shows the experimental data.

Further, the separator was also left to stand for one hour in an oven set at 110° C. so as to obtain a thermal shrinking rate $X_2$ (%) at 110° C. in the direction parallel to the winding axis (short side direction) and a thermal shrinking rate $Y_2$ (%) at 110° C. in the winding direction (long side direction). The thermal shrinking rate was obtained from the difference in size between the separator before the heating in the oven and the separator after the heating in the oven. Table 1 also shows the experimental data.

\<Preparation of Liquid Nonaqueous Electrolyte\>

A nonaqueous solvent was prepared by mixing ethylene carbonate (EC) and γ-butyrolactone (GBL) in a weight ratio of 1:2, followed by adding o-chlorotoluene (o-CT) to the mixture in an amount of 5% by weight based on the total weight of the nonaqueous solvent. The oxidation potential of o-chlorotoluene was 4.8V relative to the potential of lithium metal. Then, a liquid nonaqueous electrolyte was prepared by dissolving lithium tetrafluoroborate ($LiBF_4$) in the nonaqueous solvent thus prepared in an amount of 1.5 mol/L.

\<Preparation of Electrode Group\>

A positive electrode lead formed of a band-like aluminum foil having a thickness of 100 μm was welded by an ultrasonic welding to the current collector of the positive electrode. Also, a negative electrode lead formed of a band-like nickel foil having a thickness of 100 μm was welded by an ultrasonic welding to the current collector of the negative electrode. Then, the positive electrode and the negative electrode were laminated one upon the other with the separator interposed therebetween such that each of the both edge portions of the separator in the short side direction was allowed to protrude outward from the edges of the positive electrode and the negative electrode in the short side direction. The laminate structure under the particular state was spirally wound and, then, molded in a flattened shape so as to manufacture the electrode group.

Incidentally, the protruding amount of one edge portion of the separator from the edge of the negative electrode, which was 2 mm, was equal to that of the other edge portion of the separator.

\<Preparation of Case\>

A case film was prepared by laminating a stretched nylon film having a thickness of 25 μm, an aluminum alloy foil (JIS H 4160 A8079 material) having a thickness of 40 μm, and a linear low density polyethylene film (sealant film) having a thickness of 30 μm one upon the other in the order mentioned with an urethane-based adhesive used between the adjacent films. An overhanging or deep drawing treatment was applied to the case film so as to form a housing section of the electrode such that the sealant film included in the case film constituted the inner surface of the housing section, followed by folding the case film by 180° such that the sealant film was positioned inside so as to form a lid, thereby obtaining an oblong case body, i.e., an oblong folded body of the case film.

\<Preparation of Nonaqueous Electrolyte Secondary Battery\>

The electrode group was housed in the housing section of the oblong case body such that the positive electrode lead terminal and the negative electrode lead terminal were positioned outside the case body. Then, heat-sealing was applied to the short sides of the oblong case body such that the positive electrode lead and the negative electrode lead were allowed to extend to the outside of the case body through the sealed short side of the oblong case body and to one of the long sides of the oblong case body perpendicular to the sealed short side. As a result, the case film was formed into an oblong case that was open in one long side.

Under the state described above, vacuum drying was applied to the electrode group housed in the case for 12 hours, followed by pouring the liquid nonaqueous electrolyte into the electrode group housed in the case in an amount of 4.8 g per 1 Ah of the battery capacity. Further, that side of the case which had not been heat-sealed was sealed by heat seal. As a result, manufactured was a thin type nonaqueous electrolyte secondary battery constructed as shown in FIG. 1. The nonaqueous electrolyte secondary battery thus manufactured was sized at 3.6 mm in thickness, 35 mm in width, and 62 mm in height.

An initial charge-discharge treatment was applied to the nonaqueous electrolyte secondary battery as follows. Specifically, the secondary battery was charged under room temperature for 15 hours under a constant charging current of 0.2 C (104 mA) and a constant charging voltage. As a result, the secondary battery was charged to 4.2V. Then, the battery was discharged under room temperature to 3.0V under a discharge current of 0.2 C.

Incidentally, a current of 1 C denotes the current required for discharging the battery having a nominal capacity (Ah) in one hour. It follows that the current of 0.2 C noted above denotes the current required for discharging a battery having a nominal capacity (Ah) in 5 hours.

EXAMPLES 2 AND 3

A nonaqueous electrolyte secondary battery was manufactured substantially as in Example 1, except that the addition amount of o-chlorotoluene (o-CT) was changed as shown in Table 1.

EXAMPLE 4

A nonaqueous electrolyte secondary battery was manufactured substantially as in Example 1, except that the separator was manufactured as follows.

Specifically, a raw film was prepared first by an inflation method by extruding a mixture consisting of 25% by weight of polyethylene and 75% by weight of paraffin wax at the extruding temperature of 170° C. and an extruding rate of 10 kg/h. The extrusion was performed by using a biaxial extruder. The raw film thus prepared was dipped in isopropanol so as to remove the paraffin wax by extraction. Then, the resultant polyethylene film was stretched at 100° C. by using a roll stretching machine. In this step, the film was stretched in a vertical direction to a length 3 times as much as the length before the stretching. The film stretched by using the roll stretching machine was further stretched by using a tenter stretching machine. In this step, the film was stretched at 120° C. in a lateral direction to a length 2.5 times as much as the length before the stretching. Further, a thermal shrinking treatment was applied to the stretched film by using a heat roll set at 85° C. so as to obtain finally a finely porous polyethylene film having a thickness of 25 μm and a gas permeability of 420 seconds/100 $cm^3$. A separator piece having a width of 55 mm was cut out from the finely porous polyethylene film thus prepared so as to obtain the separator for the secondary battery.

The thermal shrinking rate of the separator at each of 90° C. and 110° C. was measured as in Example 1, with the result as shown in Table 1.

EXAMPLE 5

A nonaqueous electrolyte secondary battery was manufactured substantially as in Example 1, except that the separator was manufactured as follows.

Specifically, a raw film was prepared first by an inflation method by extruding a mixture consisting of 28% by weight of polyethylene and 72% by weight of paraffin wax at the extruding temperature of 170° C. and an extruding rate of 10 kg/h. The extrusion was performed by using a biaxial extruder. The raw film thus prepared was dipped in isopropanol so as to remove the paraffin wax by extraction. Then, the resultant polyethylene film was stretched at 100° C. by using a roll stretching machine. In this step, the film was stretched in a vertical direction to a length 6 times as much as the length before the stretching. The film stretched by using the roll stretching machine was further stretched by using a tenter stretching machine. In this step, the film was stretched at 120° C. in a lateral direction to a length 4 times as much as the length before the stretching. Further, a thermal shrinking treatment was applied to the stretched film by using a heat roll set at 75° C. so as to obtain finally a finely porous polyethylene film having a thickness of 25 μm and a gas permeability of 350 seconds/100 $cm^3$. A separator piece having a width of 55 mm was cut out from the finely porous polyethylene film thus prepared so as to obtain the separator for the secondary battery.

The thermal shrinking rate of the separator at each of 90° C. and 110° C. was measured as in Example 1, with the result as shown in Table 1.

EXAMPLES 6 AND 7

A nonaqueous electrolyte secondary battery was manufactured substantially as in Example 5, except that the addition amount of o-chlorotoluene (o-CT) was changed as shown in Table 1.

EXAMPLE 8

A nonaqueous electrolyte secondary battery was manufactured substantially as in Example 1, except that the separator was manufactured as follows.

Specifically, a raw film was prepared first by an inflation method by extruding a mixture consisting of 28% by weight of polyethylene and 72% by weight of paraffin wax at the extruding temperature of 170° C. and an extruding rate of 10 kg/h. The extrusion was performed by using a biaxial extruder. The raw film thus prepared was dipped in isopropanol so as to remove the paraffin wax by extraction. Then, the resultant polyethylene film was stretched at 100° C. by using a roll stretching machine. In this step, the film was stretched in a vertical direction to a length 6 times as much as the length before the stretching. The film stretched by using the roll stretching machine was further stretched by using a tenter stretching machine. In this step, the film was stretched at 120° C. in a lateral direction to a length 4 times as much as the length before the stretching. Further, a thermal shrinking treatment was applied to the stretched film by using a heat roll set at 85° C. so as to obtain finally a finely porous polyethylene film having a thickness of 25 μm and a gas permeability of 380 seconds/100 $cm^3$. A separator piece having a width of 55 mm was cut out from the finely porous polyethylene film thus prepared so as to obtain the separator for the secondary battery.

The thermal shrinking rate of the separator at each of 90° C. and 110° C. was measured as in Example 1, with the result as shown in Table 1.

EXAMPLES 9 to 11

A nonaqueous electrolyte secondary battery was manufactured substantially as in Example 1, except that o-fluorotoluene (o-FT) was used as the halogenated aromatic hydrocarbon in place of o-chlorotoluene in an amount shown in Table 1. Incidentally, the oxidation potential of o-fluorotoluene is 4.9V relative to the potential of lithium metal.

EXAMPLE 12

A nonaqueous electrolyte secondary battery was manufactured substantially as in Example 1, except that the separator used was similar to that used in Example 4, and that o-fluorotoluene was used in place of o-chlorotoluene in an amount shown in Table 1.

EXAMPLES 13 to 15

A nonaqueous electrolyte secondary battery was manufactured substantially as in Example 1, except that the separator used was similar to that used in Example 5, and that o-fluorotoluene was used as the halogenated aromatic hydrocarbon in an amount shown in Table 1.

EXAMPLE 16

A nonaqueous electrolyte secondary battery was manufactured substantially as in Example 1, except that the separator used was similar to that used in Example 8, and that o-fluorotoluene was used as the halogenated aromatic hydrocarbon in an amount shown in Table 1.

COMPARATIVE EXAMPLE 1

A nonaqueous electrolyte secondary battery was manufactured substantially as in Example 1, except that the separator was prepared as follows.

Specifically, a raw film was prepared first by an inflation method by extruding a mixture consisting of 30% by weight of polyethylene and 70% by weight of paraffin wax at the extruding temperature of 170° C. and an extruding rate of 10 kg/h. The extrusion was performed by using a biaxial extruder. The raw film thus prepared was dipped in isopropanol so as to remove the paraffin wax by extraction. Then, the resultant polyethylene film was stretched at 100° C. by using a roll stretching machine. In this step, the film was stretched in a vertical direction to a length 8 times as much as the length before the stretching. The film stretched by using the roll stretching machine was further stretched by using a tenter stretching machine. In this step, the film was stretched at 120° C. in a lateral direction to a length 5 times as much as the length before the stretching. Further, a thermal shrinking treatment was applied to the stretched film by using a heat roll set at 80° C. so as to obtain finally a finely porous polyethylene film having a thickness of 25 μm and a gas permeability of 380 seconds/100 cm$^3$. A separator piece having a width of 55 mm was cut out from the finely porous polyethylene film thus prepared so as to obtain the separator for the secondary battery.

The thermal shrinking rate of the separator at each of 90° C. and 110° C. was measured as in Example 1, with the result as shown in Table 1.

COMPARATIVE EXAMPLE 2

A nonaqueous electrolyte secondary battery was manufactured substantially as in Example 1, except that the separator was prepared as follows.

Specifically, a raw film was prepared first by an inflation method by extruding a mixture consisting of 30% by weight of polyethylene and 70% by weight of paraffin wax at the extruding temperature of 170° C. and an extruding rate of 10 kg/h. The extrusion was performed by using a biaxial extruder. The raw film thus prepared was dipped in isopropanol so as to remove the paraffin wax by extraction. Then, the resultant polyethylene film was stretched at 100° C. by using a roll stretching machine. In this step, the film was stretched in a vertical direction to a length 8 times as much as the length before the stretching. The film stretched by using the roll stretching machine was further stretched by using a tenter stretching machine. In this step, the film was stretched at 120° C. in a lateral direction to a length 4 times as much as the length before the stretching. Further, a thermal shrinking treatment was applied to the stretched film by using a heat roll set at 75° C. so as to obtain finally a finely porous polyethylene film having a thickness of 25 μm and a gas permeability of 330 seconds/100 cm$^3$. A separator piece having a width of 55 mm was cut out from the finely porous polyethylene film thus prepared so as to obtain the separator for the secondary battery.

The thermal shrinking rate of the separator at each of 90° C. and 110° C. was measured as in Example 1, with the result as shown in Table 1.

COMPARATIVE EXAMPLE 3

A nonaqueous electrolyte secondary battery was manufactured substantially as in Example 1, except that the separator was prepared as follows.

Specifically, a raw film was prepared first by an inflation method by extruding a mixture consisting of 30% by weight of polyethylene and 70% by weight of paraffin wax at the extruding temperature of 170° C. and an extruding rate of 10 kg/h. The extrusion was performed by using a biaxial extruder. The raw film thus prepared was dipped in isopropanol so as to remove the paraffin wax by extraction. Then, the resultant polyethylene film was stretched at 100° C. by using a roll stretching machine. In this step, the film was stretched in a vertical direction to a length 6 times as much as the length before the stretching. The film stretched by using the roll stretching machine was further stretched by using a tenter stretching machine. In this step, the film was stretched at 120° C. in a lateral direction to a length 5 times as much as the length before the stretching. Further, a thermal shrinking treatment was applied to the stretched film by using a heat roll set at 80° C. so as to obtain finally a finely porous polyethylene film having a thickness of 25 μm and a gas permeability of 380 seconds/100 cm$^3$. A separator piece having a width of 55 mm was cut out from the finely porous polyethylene film thus prepared so as to obtain the separator for the secondary battery.

The thermal shrinking rate of the separator at each of 90° C. and 110° C. was measured as in Example 1, with the result as shown in Table 1.

An over-charging test was applied to 100 samples of the secondary battery manufactured in each of Examples 1 to 16 and Comparative Examples 1 to 3. The over-charging test was conducted under a constant current of 3 A and a constant voltage of 15V so as to count the number of battery samples that were ignited during the test that was continued for 12 hours. Table 1 shows the experimental data. Also, the battery temperature during the over-charging test was measured, thereby highest battery temperature of each sample was measured. Table 1 also shows the average value of the highest battery temperatures measured in the samples. Of course, the battery samples that were ignited during the over-charging test were excluded from the calculation for determining the average value of the highest battery temperatures.

TABLE 1

| | Thermal shrinking rate at 90° C. (%) | | | Thermal shrinking rate at 110° C. (%) | | o-CT addition amount (wt %) | o-FT addition amount (wt %) | The number of ignited batteries (among 100 samples) | Highest battery temperature (° C.) |
|---|---|---|---|---|---|---|---|---|---|
| | Winding axis $X_1$ | Winding direction $Y_1$ | $(Y_1/X_1)$ | Winding axis $X_2$ | Winding direction $Y_2$ | | | | |
| Example 1 | 0.5 | 0.75 | 1.5 | 5 | 7 | 5 | 0 | 0 | 105 |
| Example 2 | 0.5 | 0.75 | 1.5 | 5 | 7 | 0.1 | 0 | 0 | 108 |
| Example 3 | 0.5 | 0.75 | 1.5 | 5 | 7 | 15 | 0 | 0 | 110 |
| Example 4 | 0.5 | 0.75 | 1.5 | 5 | 5 | 5 | 0 | 0 | 108 |
| Example 5 | 2 | 4 | 2 | 10 | 20 | 5 | 0 | 0 | 114 |
| Example 6 | 2 | 4 | 2 | 10 | 20 | 0.1 | 0 | 0 | 114 |
| Example 7 | 2 | 4 | 2 | 10 | 20 | 15 | 0 | 0 | 118 |

TABLE 1-continued

| | Thermal shrinking rate at 90° C. (%) | | | Thermal shrinking rate at 110° C. (%) | | o-CT addition amount (wt %) | o-FT addition amount (wt %) | The number of ignited batteries (among 100 samples) | Highest battery temperature (° C.) |
|---|---|---|---|---|---|---|---|---|---|
| | Winding axis $X_1$ | Winding direction $Y_1$ | $(Y_1/X_1)$ | Winding axis $X_2$ | Winding direction $Y_2$ | | | | |
| Example 8 | 2 | 3 | 1.5 | 10 | 10 | 5 | 0 | 8 | 126 |
| Example 9 | 0.5 | 0.75 | 1.5 | 5 | 7 | 0 | 5 | 0 | 96 |
| Example 10 | 0.5 | 0.75 | 1.5 | 5 | 7 | 0 | 0.1 | 0 | 101 |
| Example 11 | 0.5 | 0.75 | 1.5 | 5 | 7 | 0 | 15 | 0 | 99 |
| Example 12 | 0.5 | 0.75 | 1.5 | 5 | 5 | 0 | 5 | 0 | 103 |
| Example 13 | 2 | 4 | 2 | 10 | 20 | 0 | 5 | 0 | 108 |
| Example 14 | 2 | 4 | 2 | 10 | 20 | 0 | 0.1 | 0 | 110 |
| Example 15 | 2 | 4 | 2 | 10 | 20 | 0 | 15 | 0 | 111 |
| Example 16 | 2 | 3 | 1.5 | 10 | 10 | 0 | 5 | 5 | 125 |
| Comparative Example 1 | 2 | 4 | 2 | 15 | 20 | 5 | 0 | 63 | 138 |
| Comparative Example 2 | 2 | 6 | 3 | 10 | 30 | 5 | 0 | 68 | 135 |
| Comparative Example 3 | 2 | 2.4 | 1.2 | 10 | 15 | 5 | 0 | 32 | 130 |

The separator included in the secondary battery for each of Examples 1 to 16 satisfied the conditions given by formulas (1) to (3) given previously. In each of Examples 1 to 16, the number of battery samples that were ignited after the current breakage during the over-charging test was smaller than that in each of Comparative Examples 1 and 2, as apparent from Table 1. Table 1 also supports that, where the thermal shrinking rates $X_2$ and $Y_2$ are equal to each other, the number of ignited batteries can be suppressed if each of the thermal shrinking rates $X_2$ and $Y_2$ is 5.0% or less, as apparent from the comparison among Examples 4, 8 and 16.

Also, the battery temperature was found to be low in the secondary battery for each of Examples 1 to 4 and 9 to 12 in which the thermal shrinking rate $X1$ was low. In regard to secondary batteries including the same kind of the separator, the battery temperature of the secondary battery using o-fluorotoluene as the halogenated aromatic hydrocarbon was found to be lower than the battery temperature of secondary battery using o-chlorotoluene as the halogenated aromatic hydrocarbon.

On the other hand, the separator having a high thermal shrinking rate at 110° C. was used in the secondary battery for each of Comparative Examples 1 and 2. In this case, the internal short circuit was caused by the thermal shrinkage of the separator after the shutdown mechanism of the separator performed its function. As a result, current was caused to flow gradually so as to elevate the battery temperature, leading finally to ignition of the secondary battery.

In order to confirm the thermal shrinkage of the separator, the electrode group used in each of Examples 1, 5 and Comparative Examples 1 to 3 was left to stand for 12 hours within an oven set at 110° C. As a result, the separator that had been shrunk to cause the edge of the separator to have been withdrawn inside the positive electrode was not found at all in the electrode groups used in Examples 1 and 5. However, in the electrode group for each of Comparative Examples 1 to 3, the separator was found to have been shrunk such that the edge portion of the separator was withdrawn inside the positive electrode so as to break the insulation between the positive electrode and the negative electrode.

Each of the Examples described above is directed to a thin type nonaqueous electrolyte secondary battery comprising an electrode group that is wound in a flattened shape. However, it is also possible to apply similarly the technical idea of the present invention to a cylindrical nonaqueous electrolyte secondary battery comprising an electrode group that is wound spirally and to a prismatic nonaqueous electrolyte secondary battery comprising an electrode group having a flat shape.

As described above in detail, one embodiment of the present invention provides a nonaqueous electrolyte secondary battery that permits suppressing the ignition under an over-charged state of the battery.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A nonaqueous electrolyte secondary battery, comprising:
an electrode group prepared by winding spirally or in a flattened shape a laminate structure including a positive electrode, a negative electrode, and a separator interposed between the positive and negative electrodes; and
a nonaqueous electrolyte held by the electrode group;
wherein an edge portion of the separator in a direction perpendicular to a winding direction protrudes outward from edges of the positive and negative electrodes in the direction perpendicular to the winding direction, and the separator satisfies conditions given by formulas (1) to (3) given below:

$$0 \leq X1 \leq (Y1/1.5) \leq 10 \quad (1)$$

$$X2 \leq 10 \quad (2)$$

$$X_2 \leq Y_2 \leq 20 \quad (3)$$

where Y1 represents a thermal shrinking rate (%) in the winding direction at 90° C. of the separator, X1 represents a thermal shrinking rate (%) in the direction perpendicular to the winding direction at 90° C. of the separator, Y2 represents a thermal shrinking rate (%) in the winding direction at 110° C. of the separator, and X2 represents a thermal shrinking rate (%) in the direction perpendicular to the winding direction at 110° C. of the separator.

2. The nonaqueous electrolyte secondary battery according to claim 1, wherein a protruding amount of the separator in the direction perpendicular to the winding direction from the edge of the negative electrode in the direction perpendicular to the winding direction falls within a range of 0.5 mm to 5 mm.

3. The nonaqueous electrolyte secondary battery according to claim 1, wherein the thermal shrinking rate X1 of the separator satisfies the condition given by formula (4) given below:

$$0.1 \leq X1 \leq (Y1/1.5) \leq 10 \qquad (4).$$

4. The nonaqueous electrolyte secondary battery according to claim 1, wherein the thermal shrinking rate X2 of the separator is not larger than 5%.

5. The nonaqueous electrolyte secondary battery according to claim 1, wherein the thermal shrinking rate Y1 of the separator falls within a range of 0.5% to 7%.

6. The nonaqueous electrolyte secondary battery according to claim 1, wherein the thermal shrinking rate Y2 of the separator satisfies the condition given in formula (5) given below:

$$X_2 < Y_2 \leq 10 \qquad (5).$$

7. The nonaqueous electrolyte secondary battery according to claim 1, wherein a protruding amount of the separator in the direction perpendicular to the winding direction from the edge of the negative electrode in the direction perpendicular to the winding direction falls within a range of 1 mm to 3 mm.

8. A nonaqueous electrolyte secondary battery, comprising:
an electrode group prepared by winding spirally or in a flattened shape a laminate structure including a positive electrode, a negative electrode, and a separator interposed between the positive and negative electrodes; and
a nonaqueous electrolyte held by the electrode group; the nonaqueous electrolyte containing at least one kind of halogenated toluene compound selected from the group consisting of o-chlorotoluene, p-chlorotoluene, and o-fluorotoluene;
wherein an edge portion of the separator in a direction perpendicular to a winding direction protrudes outward from edges of the positive and negative electrodes in the direction perpendicular to the winding direction, and the separator satisfies conditions given by formulas (1) to (3) given below:

$$0 \leq X1 \leq (Y1/1.5) \leq 10 \qquad (1)$$

$$X2 \leq 10 \qquad (2)$$

$$X2 \leq Y2 \leq 20 \qquad (3)$$

where Y1 represents a thermal shrinking rate (%) in the winding direction at 90° C. of the separator, X1 represents a thermal shrinking rate (%) in the direction perpendicular to the winding direction at 90° C. of the separator, Y2 represents a thermal shrinking rate (%) in the winding direction at 110° C. of the separator, and X2 represents a thermal shrinking rate (%) in the direction perpendicular to the winding direction at 110° C. of the separator.

9. The nonaqueous electrolyte secondary battery according to claim 8, wherein the nonaqueous electrolyte further contains γ-butyrolactone and a cyclic carbonate.

10. The nonaqueous electrolyte secondary battery according to claim 8, wherein a protruding amount of the separator in the direction perpendicular to the winding direction from the edge of the negative electrode in the direction perpendicular to the winding direction falls within a range of 0.5 mm to 5 mm.

11. The nonaqueous electrolyte secondary battery according to claim 8, wherein the thermal shrinking rate $X_1$ of the separator satisfies the condition given by formula (4) given below:

$$0.1 X1 (Y1/1.5) \leq 10 \qquad (4).$$

12. The nonaqueous electrolyte secondary battery according to claim 8, wherein the thermal shrinking rate $X_2$ of the separator is not larger than 5%.

13. The nonaqueous electrolyte secondary battery according to claim 8, wherein the thermal shrinking rate $Y_2$ of the separator satisfies the condition given in formula (5) given below:

$$X_2 \leq Y_2 \leq 10 \qquad (5).$$

14. The nonaqueous electrolyte secondary battery according to claim 8, wherein the thermal shrinking rate $Y_1$ of the separator falls with in a range of 0.5% to 7%.

* * * * *